(12) United States Patent
Heller, Jr.

(10) Patent No.: US 9,740,608 B2
(45) Date of Patent: *Aug. 22, 2017

(54) GARBAGE COLLECTION AND OTHER MANAGEMENT OF MEMORY HEAPS

(71) Applicant: INTERNATIONAL BUSINESS MACHINES CORPORATION, Armonk, NY (US)

(72) Inventor: Thomas J. Heller, Jr., Rhinebeck, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/846,887

(22) Filed: Sep. 7, 2015

(65) Prior Publication Data
US 2016/0117117 A1    Apr. 28, 2016

Related U.S. Application Data

(63) Continuation of application No. 14/521,006, filed on Oct. 22, 2014, now Pat. No. 9,430,153.

(51) Int. Cl.
*G06F 12/02* (2006.01)
*G06F 3/06* (2006.01)
*G06F 9/455* (2006.01)

(52) U.S. Cl.
CPC ........ *G06F 12/0253* (2013.01); *G06F 3/0604* (2013.01); *G06F 3/0608* (2013.01);
(Continued)

(58) Field of Classification Search
CPC ............. G06F 12/0269; G06F 12/0253; G06F 12/0261
(Continued)

(56) References Cited

U.S. PATENT DOCUMENTS 6,480,862 B1    11/2002    Gall
6,594,678 B1    7/2003    Stoutamire et al.
(Continued)

FOREIGN PATENT DOCUMENTS

WO    WO 2015026966 A1 *    2/2015    ......... G06F 9/45533

OTHER PUBLICATIONS

"z/Architecture—Principles of Operation," Publication No. SA22-7832-09, 10th Edition, Sep. 2012, 1568 pages.
(Continued)

*Primary Examiner* — Pierre-Michel Bataille
(74) *Attorney, Agent, or Firm* — Margaret A. McNamara, Esq.; Blanche E. Schiller, Esq.; Heslin Rothenberg Farley & Mesiti P.C.

(57) ABSTRACT

A memory heap management facility is provided that is able to perform various management tasks, including, but not limited to, garbage collection, compaction, and/or re-ordering of objects within a heap. One or more of these management tasks improve system performance by limiting movement of pages in and out of virtual memory. The garbage collection technique selectively performs garbage collection such that certain objects, such as old but live, infrequently referenced objects, are not garbage collected each time garbage collection is performed.

9 Claims, 15 Drawing Sheets

(52) U.S. Cl.
CPC .......... *G06F 3/0631* (2013.01); *G06F 3/0644* (2013.01); *G06F 3/0652* (2013.01); *G06F 3/0665* (2013.01); *G06F 3/0673* (2013.01); *G06F 9/45504* (2013.01); *G06F 9/45558* (2013.01); *G06F 12/02* (2013.01); *G06F 2009/45583* (2013.01); *G06F 2212/1041* (2013.01); *G06F 2212/152* (2013.01)

(58) Field of Classification Search
USPC ............................ 711/170, E12.006, E12.008
See application file for complete search history.

(56) References Cited

U.S. PATENT DOCUMENTS

| | | | |
|---|---|---|---|
| 6,804,765 | B2 | 10/2004 | Kolodner et al. |
| 6,865,657 | B1 | 3/2005 | Traversat |
| 6,957,237 | B1 | 10/2005 | Traversat et al. |
| 7,010,555 | B2 | 3/2006 | Blandy et al. |
| 7,111,294 | B2 | 9/2006 | Steensgaard |
| 7,480,782 | B2 | 1/2009 | Garthwaite |
| 7,584,232 | B2 | 9/2009 | Guo |
| 7,788,300 | B2 | 8/2010 | Kuck |
| 7,962,707 | B2 | 6/2011 | Kaakani |
| 8,245,239 | B2 * | 8/2012 | Garyali ................... G06F 9/445 711/170 |
| 8,255,436 | B2 | 8/2012 | Garst, Jr. et al. |
| 9,361,224 | B2 * | 6/2016 | Flood .................. G06F 12/0269 |
| 2004/0181782 | A1 | 9/2004 | Findeisen |
| 2007/0011415 | A1 | 1/2007 | Kaakani et al. |
| 2010/0031270 | A1 | 2/2010 | Wu et al. |
| 2012/0310998 | A1 | 12/2012 | Burka et al. |
| 2012/0331018 | A1 | 12/2012 | Khanna |

OTHER PUBLICATIONS

Wagner, et al., "Compartmental Memory Management in a Modern Web Browser," ACM SIGPLAN notices, 46 (11), Jun. 2011, 10 pages.

Bailey, Chris, "Java Garbage Collection", IBM Software Group, http://www-01.ibm.com/support/docview.wss?uid=swg27013824&aid=1; (No Date Information Available), 55 pages.

Office Action for U.S. Appl. No. 14/521,006 dated Jan. 19, 2016, pp. 1-15.

Heller, Thomas J., Jr., "Garbage Collection and Other Management of Memory Heaps," U.S. Appl. No. 14/521,006, filed Oct. 22, 2014, pp. 1-60.

List of IBM Patents of Patent Applications Treated As Related, Mar. 18, 2016, pp. 1-2.

List of IBM Patents of Patent Applications Treated as Related, Oct. 20, 2016, pp. 1-2.

Heller, Thomas J, Jr., "Garbage Collection and Other Management of Memory Heaps," U.S. Appl. No. 15/245,389, filed Aug. 24, 2016, pp. 1-61.

Office Action for U.S. Appl. No. 15/245,389 dated Jan. 26, 2017, pp. 1-14.

Lieberman, Henry et al., "A Real-Time Garbage Collector Based on the Lifetimes of Objects," Communications of the ACM, Oct. 1981, pp. 1-33.

Ungar, Donald, "Generation Scavenging: A Non-Disruptive High-Performance Storage Reclamation Algorithm," Feb. 2009, pp. 1-13.

* cited by examiner

GARBAGE COLLECTION AND OTHER MANAGEMENT OF MEMORY HEAPS

This application is a continuation of U.S. Pat. No. 9,430,153, entitled "GARBAGE COLLECTION AND OTHER MANAGEMENT OF MEMORY HEAPS," issued Aug. 30, 2016, which is hereby incorporated herein by reference in its entirety.

BACKGROUND

One or more aspects relate, in general, to virtual memory of a computing environment, and in particular, to managing memory heaps of the virtual memory.

Virtual memory heaps are used by various object-oriented managed runtime environments, including, but not limited to, the Java Virtual Machine (JVM) runtime environment, Microsoft Common Language Runtime (CLR) environment, and the Smalltalk environment, as examples. The heap is the primary memory resource for such environments.

Each heap provides memory for objects of the environment, and thus, may be referred to as an object heap. An object heap includes many objects, each of which is, for instance, an instance of a class, such as a JAVA class. A heap is managed by managing the memory space of the heap, including performing garbage collection to reclaim memory space that is no longer used by the objects of the heap and reallocating new objects.

SUMMARY

Shortcomings of the prior art are overcome and additional advantages are provided through the provision of a computer-implemented method of facilitating management of memory heaps. The computer-implemented method includes, for instance, selecting a heap section of a memory heap to be examined for garbage collection, the heap section comprising a plurality of groups, the plurality of groups defined such that groups include objects of particular types, a particular type being defined based on frequency of reference of the objects within a group; selecting one or more groups of the plurality of groups of the heap section to be examined for garbage collection, the selecting being based on the particular type of the one or more groups; determining whether garbage collection is to be performed for the selected one or more groups; and performing garbage collection on the selected one or more groups based on the determining indicating garbage collection is to be performed for the selected one or more groups.

Computer program products and computer systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a memory heap management facility is provided that is able to perform various management tasks, including, but not limited to, garbage collection, compaction, and/or re-ordering of objects within a heap. One or more of these management tasks improve system performance by limiting movement of pages in and out of virtual memory.

In the examples described herein, the memory heaps are Java memory heaps, however, aspects of the invention are equally applicable to other types of heaps, such as those used by CLR, Smalltalk and/or others.

Figure 1:
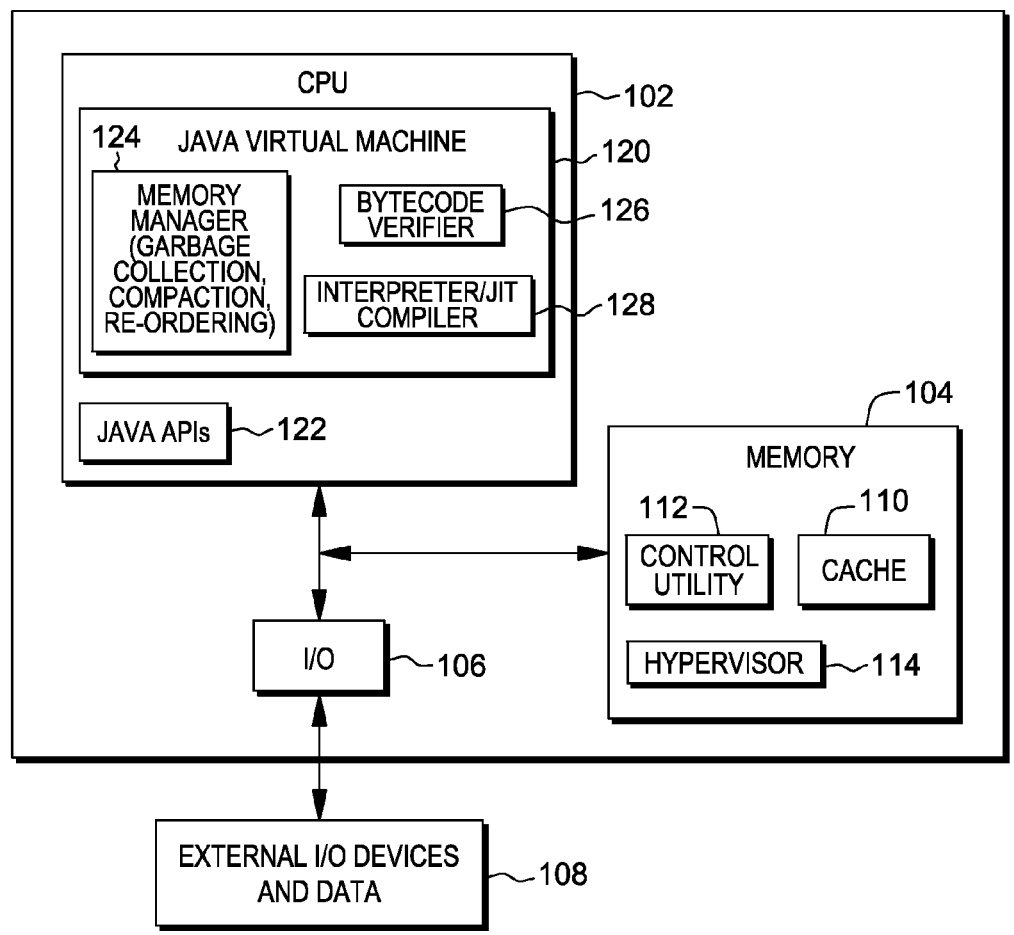
FIG. 1 depicts one example of a computing environment to incorporate and use one or more aspects of a memory heap management facility.

One example of a computing environment to incorporate and use one or more aspects of a memory heap management facility is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-09, 10th Edition, September 2012, which is hereby incorporated by reference herein in its entirety.

Z/ARCHITECTURE and IBM, as well as POWER, POWERVM and POWERPC (referenced below) are registered trademarks of International Business Machines Corporation, Armonk, N.Y. Other names used herein may be registered trademarks, trademarks or product names of International Business Machines Corporation or other companies.

As one example, computing environment 100 includes a processor (e.g., a central processing unit—CPU) 102 communicatively coupled to memory 104 and an input/output (I/O) subsystem 106. I/O subsystem 106 is further communicatively coupled to external I/O devices 108 that may include, for example, data input devices, sensors and/or output devices, such as displays.

Memory 104 includes, for instance, one or more caches 110, at least one control utility 112, such as an operating system (e.g., z/Linux, offered by International Business Machines Corporation, Armonk, N.Y.), and a hypervisor 114 used to manage virtual memory. One example of such a hypervisor is PowerVM, offered by International Business Machines Corporation.

CPU 102 includes, for instance, one or more virtual machines, such as one or more Java Virtual Machines (JVMs) 120, and may include one or more Java application programming interfaces (APIs) 122. Each virtual machine 120 includes, for instance, a memory manager 124 that performs a number of management tasks, including garbage collection, compaction, and/or object re-ordering (also referred to as swapping herein), as examples. The virtual machine further includes, in one embodiment, a bytecode verifier 126 used to verify bytecode compiled from source code, and an interpreter and/or Just-In-Time (JIT) compiler 128 used for compilation.

Figure 2A:
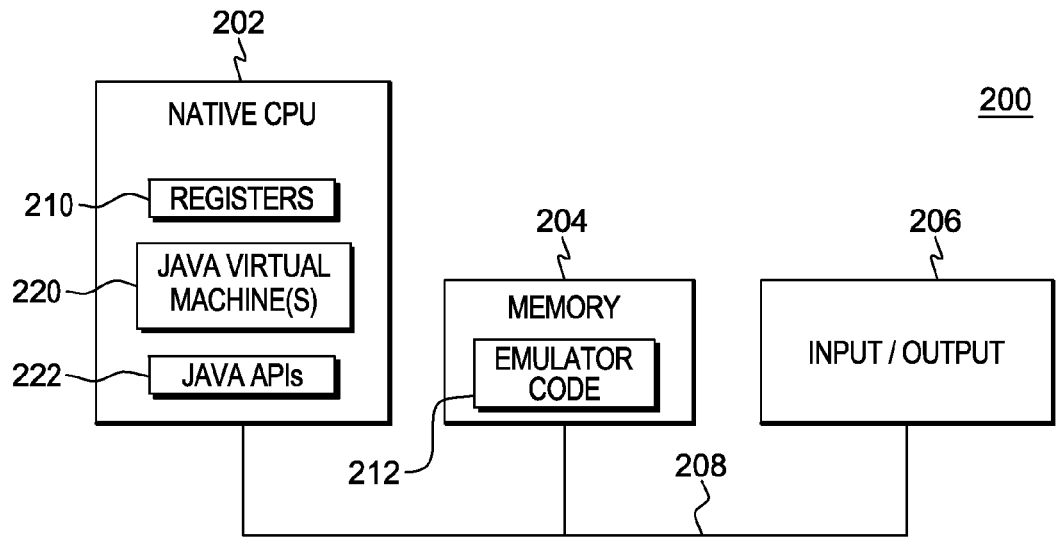
FIG. 2A depicts another example of a computing environment to incorporate and use one or more aspects of a memory heap management facility.

Another embodiment of a computing environment to incorporate and use one or more aspects of a memory heap management facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment that include information that represents the state of the environment at any particular point in time. Further, native CPU may include, for instance, one or more virtual machines 220, such as one or more Java Virtual Machines, and may include one or more Java APIs 222.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
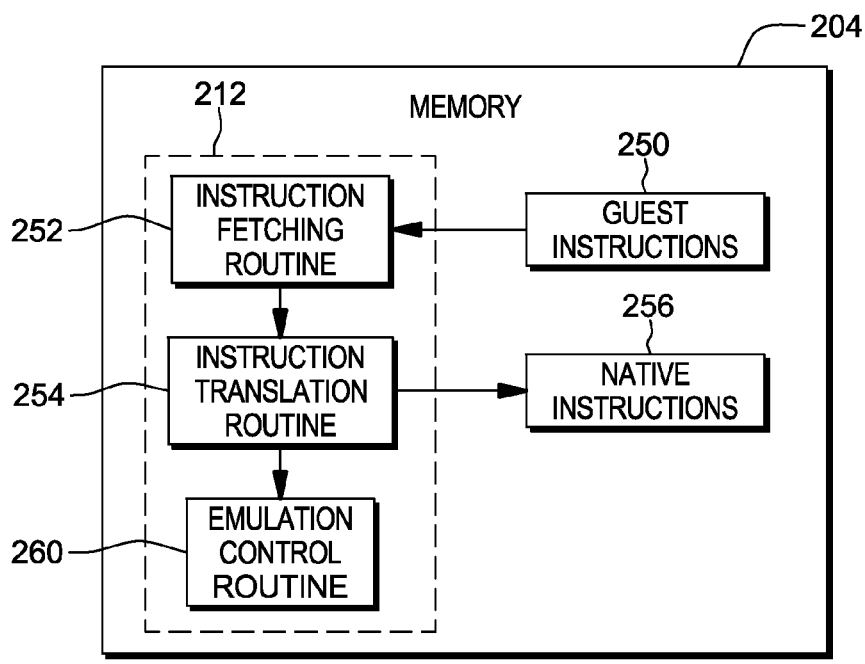
FIG. 2B depicts further details of a memory of the computing environment of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. In one or more examples, the guest instructions may include instructions to perform one or more aspects of the memory heap management facility described herein, including, but not limited to, providing Java virtual machines and/or performing garbage collection, compaction and/or re-ordering of objects in a heap. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The computing environments described above are only examples of computing environments that can be used. Other environments, including but not limited to, other types of partitioned environments, non-partitioned environments, and/or emulated environments, may be used; embodiments are not limited to any one environment or to any particular architecture.

Each environment utilizes virtual memory, which is managed by the hypervisor and makes the physical memory of the environment appear larger than it is. A portion of the virtual memory is used for memory heaps that provide memory for objects of an object-oriented managed runtime environment.

In one example, each Java Virtual Machine (JVM) uses a large memory heap to store active Java objects. Garbage collection is run on each of these heaps in order to reclaim memory space that is no longer being used (not alive objects) and to reallocate the space to new objects. The combination of a large number of JVMs used in systems, large heaps used by the JVMs, and previous garbage collection techniques leads to a very large memory working set at the hypervisor level.

It is desirable to provide a large virtual memory heap to each JVM, since a large virtual memory heap helps ensure that the JVM does not run out of memory and does not spend a large amount of CPU time for garbage collection of Java objects that are not alive. Certain operating systems, such as z/Linux, can offer a large virtual memory space in order to provide each JVM with a large memory heap. It is possible for the sum of the desired virtual memory for all of the operating system images to greatly exceed the physical memory on the hardware system used.

The hypervisor provides the virtual memory system that enables the over-commitment of physical memory. For previous JVMs, however, this over-commitment of memory does not work well at the hypervisor level. Current garbage collection techniques used by previous JVMs end up touching too many pages in the heap too often. The result at the hypervisor level is a constant movement of virtual memory pages from disk to memory and back, along with reduced system performance due to the associated CPU overhead. With current garbage collection techniques, many virtual memory pages are swapped from disk just so that the garbage collector can mark very old objects that are not otherwise being referenced often by the applications running in the JVM. Thus, in accordance with an aspect of the present invention, a technique is provided in which old (but still live) infrequently referenced objects on the Java heap are collected together and left mostly undisturbed and untouched by garbage collection operations, so that the virtual memory pages that they occupy can be swapped out to disk for long periods of time.

In one embodiment, the garbage collection technique of one or more aspects of the present invention is optimized for multiple JVMs running in multiple operating system instances, where the operating system images are themselves running in virtual servers. Real memory is saved at the hypervisor level by enabling a very high level of memory over-commitment. This is achieved, in one or more aspects, without causing very high virtual memory paging rates, and by optimizing the memory references of the virtual machines that the hypervisor is supporting, especially the garbage collection of those virtual machines.

One example of a memory heap, in accordance with one or more aspects, is described with reference to FIG. 3A. In this particular example, the heap is a Java memory heap, which is a portion of a memory address space that includes a range of addresses.

Figure 3A:
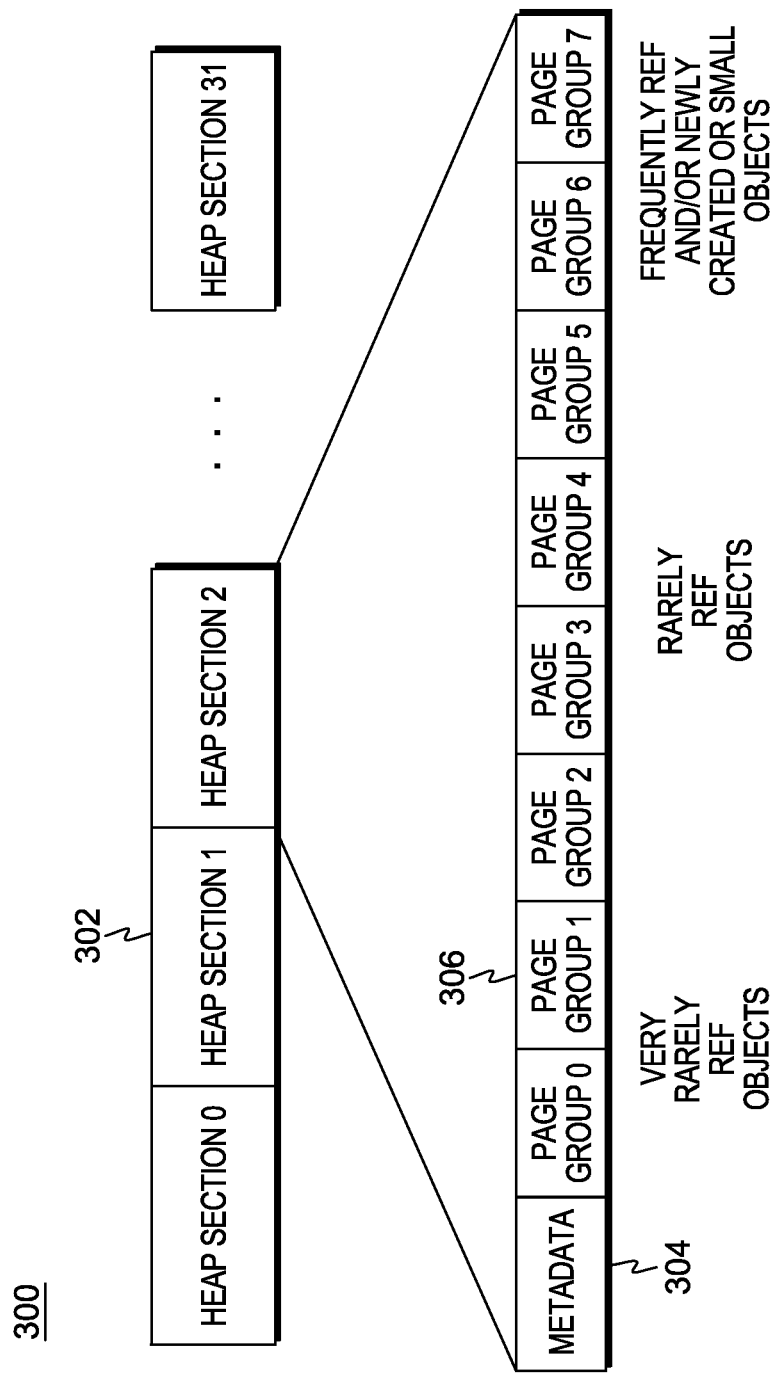
FIG. 3A depicts one example of a memory heap and details regarding one example of a heap section of the memory heap.

Referring to FIG. 3A, a memory heap 300 includes a plurality of heap sections 302. In this example, there are 32 heap sections; however, in other examples, there may be more or less heap sections. In one embodiment, additional heap sections may be added dynamically as previous heap sections become full or if certain subsections (e.g., page groups, described below) of the heap sections become full. The heap sections may be of the same size as one another, or varying sizes. Each heap section 302 includes, for instance, metadata 304 for that heap section, referred to as local metadata, and one or more page groups 306 (also referred to as groups), each of which includes one or more memory objects. The objects in the page groups are grouped, in one example, based on how frequently the objects are used. In this example, there are eight page groups; however, in other embodiments, there may be more or less than eight page groups, and/or the grouping may be based on other criteria. Further, the use of the term "page group" or "group" is for convenience only to indicate that objects within a heap section are placed together and/or moved within a heap section based on a particular criteria, such as relative reference rates. There may not be an actual group configuration. The term is used to indicate one or more objects of a selected criteria, such as a particular reference rate.

In one embodiment, as a particular example, groups 6 and 7 of a heap section include frequently referenced and/or newly created objects, while groups 0 and 1 include, for instance, very rarely referenced objects, groups 3 and 4 include rarely referenced objects, and the other groups include objects in between those characterizations on a sliding scale. The characterizations of frequently referenced, very rarely referenced and rarely referenced are based on one or more defined threshold values and/or other criteria. The characterizations are relative to one another in which frequently referenced objects are referenced more often (e.g. by some metric) than rarely referenced objects, and rarely referenced objects are referenced more often (e.g., by some metric) than very rarely referenced objects, etc. Although in this example, certain groups have certain characteristics (e.g., very rarely referenced, rarely referenced, frequently referenced), other groups may have the same or similar characteristics. For instance, page group 2 may have very rarely referenced objects as in groups 0 and 1, or it can have objects that are not as rarely referenced as those in groups 0 and 1, but more rarely referenced than those in groups 3 and 4. Many other variations exist. Further, the characteristics may be different or they may be in a different order than portrayed here. Many possibilities exist without departing from the spirit of aspects of the invention.

Figure 3B:
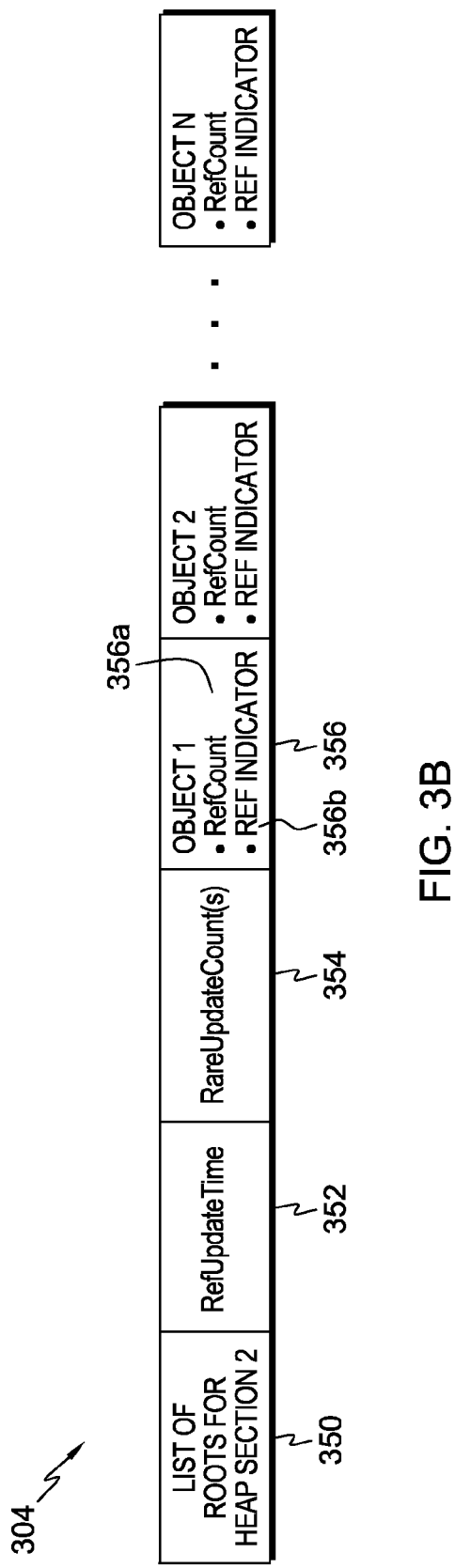
FIG. 3B depicts one example of the metadata of FIG. 3A.

Metadata 304 includes pieces of data used to assist in navigating through the page groups, as described with reference to FIG. 3B. In this example, the metadata is for heap section 2; however, the information is similar for other heap sections, and each heap section has its own local metadata. In one example, metadata 304 includes a list of roots 350 for the heap section, the list including one or more roots for the heap section; a reference update time (RefUpdateTime) 352 indicating the last time the heap section was examined for relocation of objects; a rare update count (RareUpdateCount) 354 for each page group indicating a count of iterations for the set of objects of the page group for examination for, e.g., relocation; and certain object-specific information 356 for each object. In one example, the object-specific information includes, for instance, a reference count (RefCount) 356a and a reference (Ref) indicator (e.g., a bit) 356b for each selected object of a page group. The object is, for instance, a Java object stored in the heap section; the reference count indicates, for instance, rare references and is incremented when it is determined that there has been no new references to the object during a last defined interval (e.g., time interval); and the reference indicator indicates whether the object has been referenced. In one example, there is a reference count and reference indicator only for the larger objects on the heap; that is, objects of a predefined size or a predefined range of sizes; and smaller objects that are on the heap do not include a reference count or reference indicator.

In one embodiment, the metadata may be arranged to facilitate finding data in the metadata (e.g., align objects on a predefined boundary size (e.g., 100 bytes)), etc.

One embodiment of allocating objects in a particular page group of a selected heap section of a memory heap is described with reference to FIG. 4. This logic is performed by, for instance, the memory manager of a virtual machine (e.g., JVM) executing within a processor.

Figure 4:
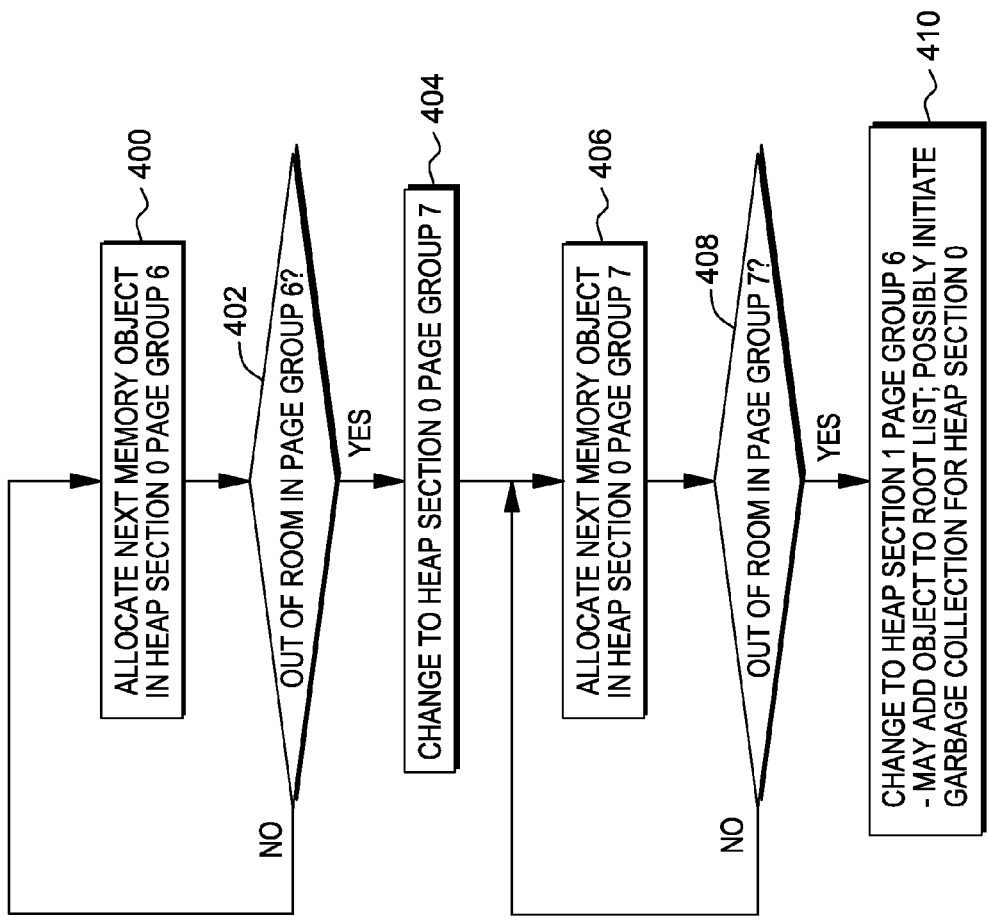
FIG. 4 depicts one embodiment of logic to allocate memory objects in a memory heap.

Referring to FIG. 4, initially, the memory manager allocates a memory object in a selected heap section and a selected page group of the heap section, STEP 400. In this particular example, it is shown that the memory object is allocated in heap section 0 (the first section of the heap), which is considered the active heap section, and page group 6, since page group 6 is, in this example, one of the groups for newly created objects. However, this is only one example. Any page group and/or heap section may be selected in other embodiments.

In allocating the object, the address of the object may be added to the root list in the metadata, if it is a parent object or its parent is not in the root list.

The memory manager then determines whether there is additional room in page group 6 for a next object to be allocated, INQUIRY 402. If there is still room, then processing continues with allocating additional memory objects in this heap section and page group, STEP 400. However, if there is no more room in the selected page group, e.g., in page group 6, then another page group in, for instance, the same heap section is selected, assuming there is such a page group (if not, then another section is selected), STEP 404. In this example, heap section 0 page group 7 is selected. Thus, the next memory object is allocated in the newly selected heap section/page group, STEP 406. Similarly, a determination is made as to whether page group 7 is out of room, INQUIRY 408. If not, then objects continue to be allocated in that heap section and page group, STEP 406. Otherwise, another section and/or page group is selected, STEP 410. For instance, if there are additional page groups in the heap section configured for new objects, then another page group in heap section 0 is selected. Otherwise, if there are no more page groups in heap section 0 configured for new objects, then a new heap section is selected, such as heap section 1. For instance, page group 6 of heap section 1 is selected. Heap section 1 becomes the new active heap section. When the object is added to heap section 1, it is determined if the parent object is also in heap section 1. If not, the address of the new object is added to the local root list for heap section 1. Additionally, in one embodiment, garbage collection is performed on heap section 0.

Although particular heaps and page groups are discussed in this embodiment, these are only examples. Any heap section and/or page group may be selected. However, in this example, certain page groups are designated as including newly referenced objects, and thus, are selected when allocating new objects.

Figure 5:
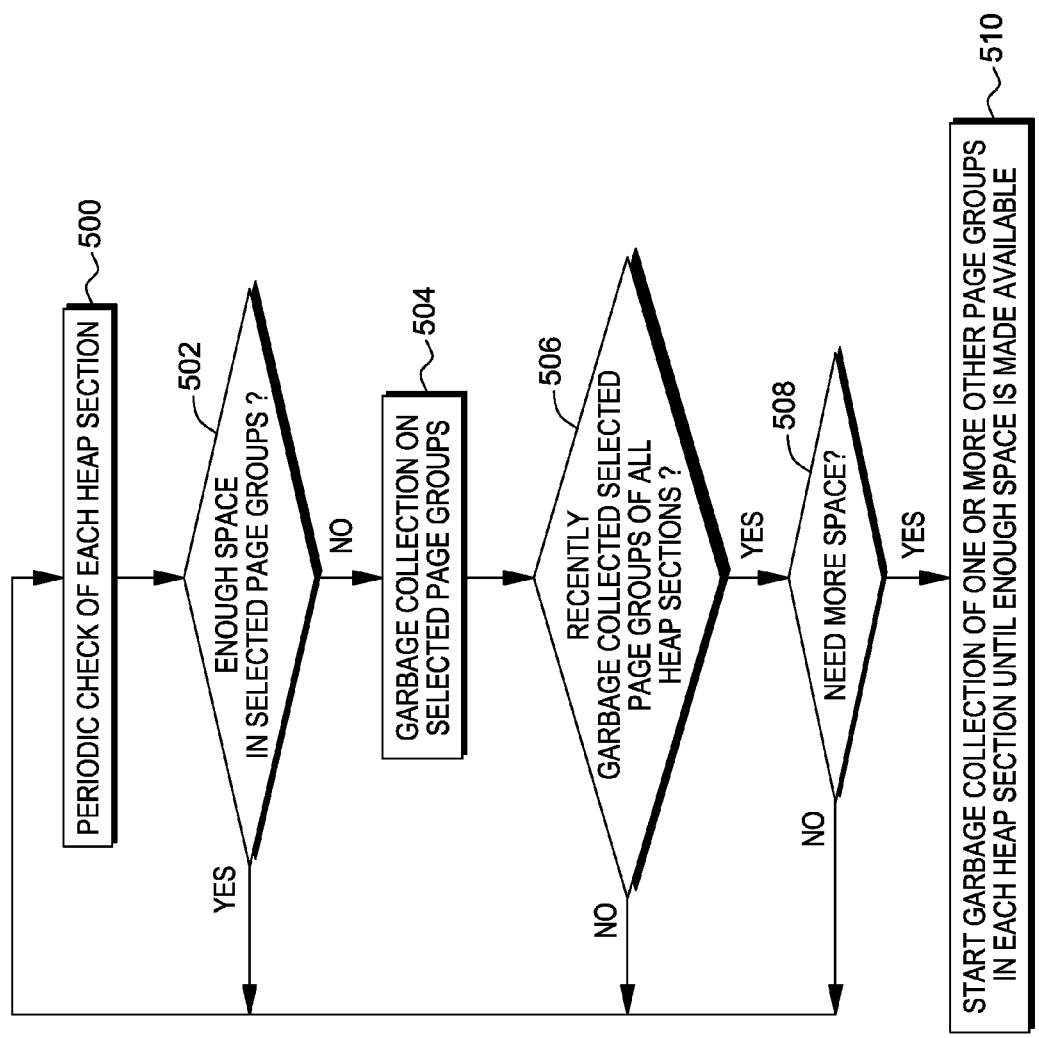
FIG. 5 depicts one embodiment of logic to determine when to perform garbage collection on a memory heap.

To reclaim space in the heap sections, garbage collection is performed by the memory manager. One embodiment of logic to determine whether garbage collection is to be performed is described with reference to FIG. 5. Initially, the memory manager periodically checks each heap section to determine if there is enough room in one or more selected page groups of the heap section, STEP 500. For instance, each heap section is checked at predefined intervals, such as every x seconds, where x is, e.g., 10. In other embodiments, other intervals may be used, such as other values for x, or based on other criteria, such as computing cycles, etc.

A determination is made as to whether there is enough space in selected page groups of the heap section, such as the most frequently referenced page groups of the heap section, e.g., page groups 6 and 7, in this example, INQUIRY 502. If there is enough space, then processing continues with STEP 500. Otherwise, garbage collection is started for page groups 6 and 7, which are the newest and most referenced objects, in this example, STEP 504.

Subsequently, the memory manager determines whether garbage collection has recently been performed on the selected page groups (e.g., groups 6 and 7) in all of the heap sections, INQUIRY 506. If not, then processing continues with STEP 500 in which another heap section is examined. Otherwise, the memory manager determines whether additional space is needed to accommodate more objects, INQUIRY 508. This determination may be made any number of ways, including, but not limited to, comparing the amount of free space to a defined value to determine whether more space is needed. If further space is not needed at this time, then processing continues with STEP 500. Otherwise, garbage collection is started in one or more other groups in each heap section until enough space is made available, STEP 510.

In a further embodiment, at each check that determines more space is needed, garbage collection is performed for all of the page groups for all of the heap sections (or for specifically chosen page groups and/or heap sections).

Further details associated with garbage collection are described with reference to FIG. 6. Each heap section may be examined separately using one thread, or in parallel using multiple threads. The logic described below is for each heap section to be garbage collected.

Figure 6:
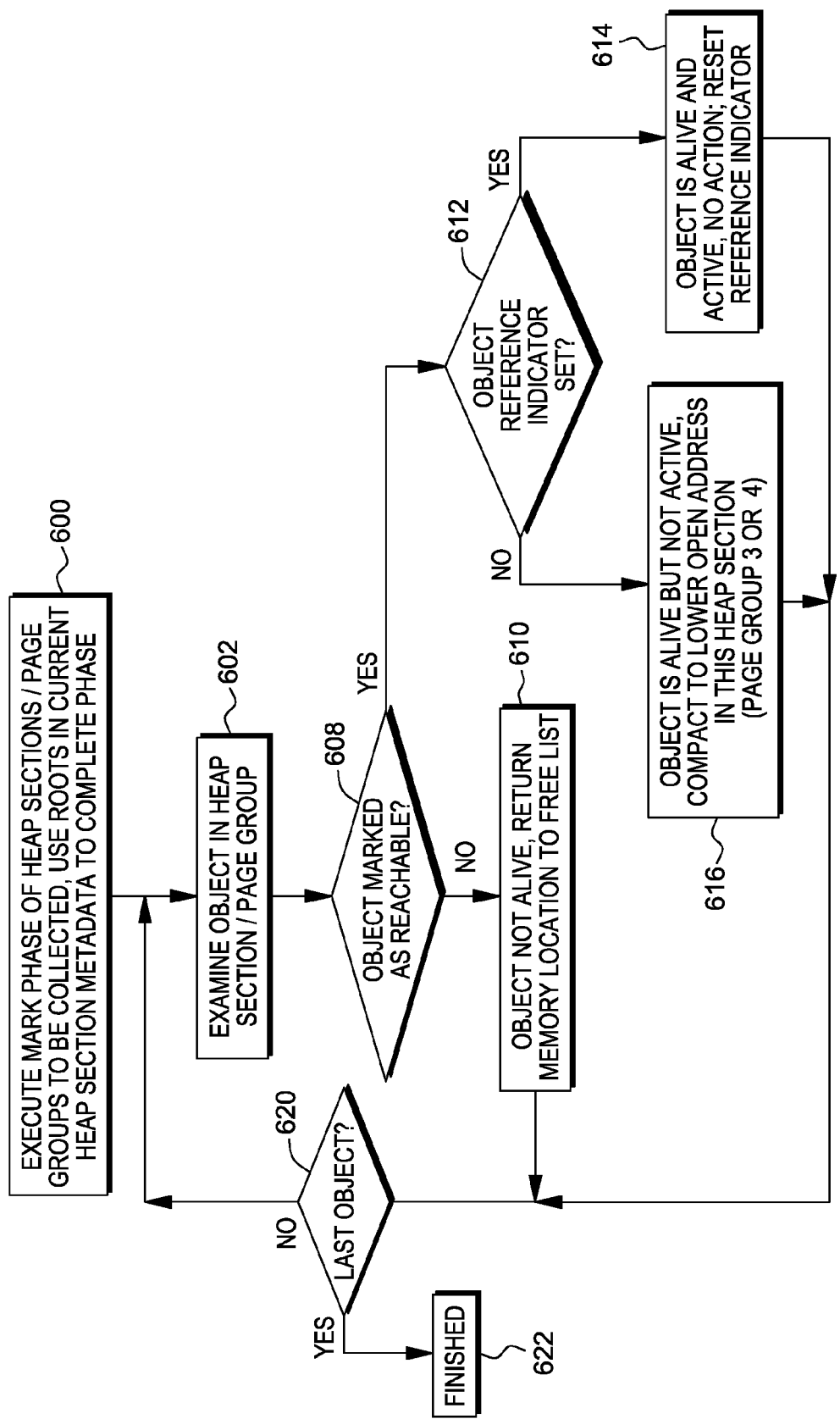
FIG. 6 depicts one embodiment of logic to perform garbage collection.

Referring to FIG. 6, initially, the memory manager executes a mark phase for the heap sections/page groups to be collected, STEP 600. In one example, this includes using the roots of the heap sections stored in the metadata to complete the phase. The mark phase includes examining the objects in the selected page groups/heap sections to determine the live objects and marking those live objects with an indicator. In one example, the mark phase does not include a complete marking of the entire heap, but instead, uses a set of roots that are specific to the current heap section being marked. For example, for heap section 2, the local roots are stored in metadata (304). A local root exists for each object that was created in the heap section/page group whose parent object is located in a different heap section/page group. The mark phase begins with each of the local roots, identifies and marks the root object and then identifies and marks any child objects that exists whose location on the heap falls within the same heap section/page group.

The memory manager examines an object in a selected page group of a selected heap section to determine if that object is marked as reachable i.e., was it marked in the mark phase as being alive, STEP 602. If the object is not marked as reachable, INQUIRY 608, then the object is not alive and the memory is returned to the free list of memory, STEP 610. Further, a determination is made as to whether the object being examined is the last object of the heap section to be examined, INQUIRY 620. If so, then garbage collection is complete for this heap section, STEP 622. Otherwise, processing continues to examine another object, STEP 602.

Returning to INQUIRY 608, if the object is marked as reachable, then a further determination is made as to whether the object's reference indicator (e.g., a bit) 356b (FIG. 3B) is set, INQUIRY 612. If the reference indicator is set, then the object is alive and active and no action is taken, except for resetting the reference indicator, STEP 614. Processing continues to INQUIRY 620.

However, returning to INQUIRY 612, if the object's reference indicator is not set, then the object is alive but not active. Thus, in one embodiment, compaction is performed, in which the object is moved to a lower open address in this heap section, such as in page group 3 or 4, STEP 616. Processing then continues to INQUIRY 620.

In a further embodiment, a check is made prior to INQUIRY 612 as to whether the object has a reference indicator. If so, then processing continues to INQUIRY 612. Otherwise, processing continues to INQUIRY 620.

In a further embodiment, the heap sections are examined to find rarely referenced objects and possibly relocate those objects to other page groups (i.e., compact the rarely referenced objects in particular page groups). One embodiment of this logic is described with reference to FIG. 7. In one example, one or more independent threads are used to examine the heap sections to find the rarely referenced objects.

Figure 7:
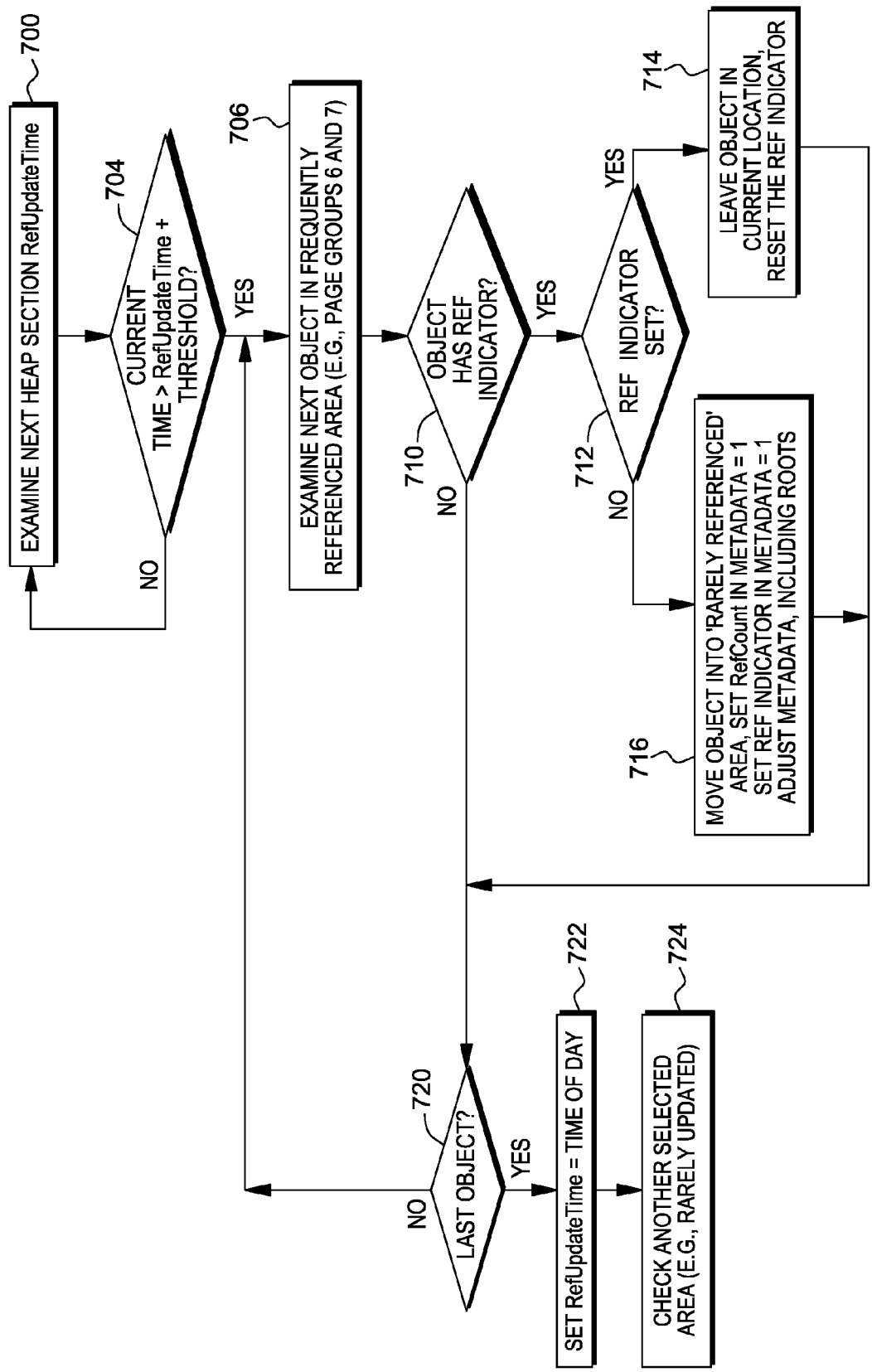
FIG. 7 depicts one embodiment of logic to compact memory objects within a memory heap.

Referring to FIG. 7, initially, the memory manager selects a heap section to be examined, STEP 700. In particular, a reference update time (RefUpdateTime) 352 (FIG. 3B) stored in the metadata for the heap section is examined. A determination is made as to whether the current time (e.g., provided by the processor's time-of-day (TOD) clock) is greater than the reference update time plus a predefined threshold (e.g., a programmable number of seconds (e.g., 2 seconds) or other time parameters), INQUIRY 704. If the current time is not greater than the reference update time plus the threshold, then processing continues with STEP 700. Otherwise, an object in a frequently referenced area of the heap section (e.g., page groups 6 and 7) is examined, STEP 706.

A determination is made as to whether the object has an associated reference indicator (e.g., 356b of FIG. 3B) in the metadata for this object, INQUIRY 710. If it does not have a reference indicator, then processing continues with INQUIRY 720, described below. However, if the object has a reference indicator, then a further determination is made as to whether that reference indicator is set (e.g., set to one), INQUIRY 712. If it is set, then the object is left in the current location and the reference indicator is reset (e.g., set to zero), STEP 714. Otherwise, the object is moved into, for instance, a rarely referenced area (e.g., page group 3 or 4) of the heap section; the reference count in the metadata (e.g., 356a of FIG. 3B) is set to one; the reference indicator in the metadata is set to one; and the metadata is adjusted including the roots to accommodate the new object in the group, STEP 716.

Subsequent to STEP 714 or 716, processing continues with INQUIRY 720. At INQUIRY 720, a determination is made as to whether it is the last object of the frequently referenced area to be examined. If it is not the last object, then processing continues to STEP 706. Otherwise, if it is the last object in the frequently referenced area to be examined, then the RefUpdateTime is set equal to the time of day, STEP 722. Further, another area is selected to be examined, such as the rarely referenced area (e.g., page groups 3 and 4), STEP 724. One embodiment of this logic is described with reference to FIG. 8.

Figure 8:
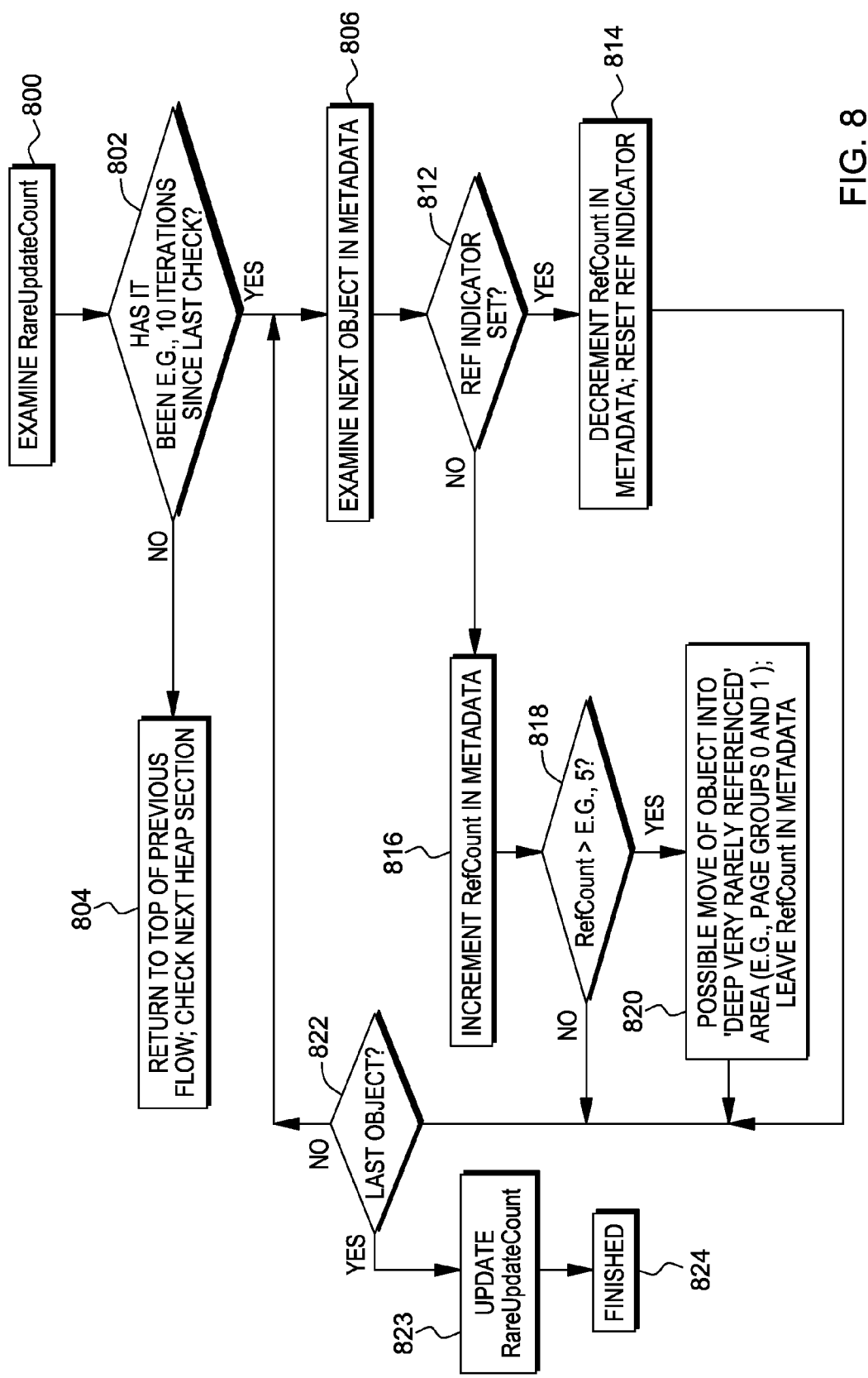
FIG. 8 depicts one embodiment of further details of compacting memory objects.

Referring to FIG. 8, the memory manager examines the rare update count (RareUpdateCount) 354 (FIG. 3B) for a selected page group of the rarely referenced area (e.g., group 3), STEP 800. A determination is made as to whether it has been a predefined number of iterations (e.g., 10) since the last check of this page group, INQUIRY 802. If not, then processing continues with STEP 700 of FIG. 7 to check a next heap section, STEP 804. Otherwise, a first object (or other selected object) of the selected page group in the metadata is examined, STEP 806. A determination is made as to whether the reference indicator for the object is set, INQUIRY 812. (In a further embodiment, a check is made prior to INQUIRY 812 as whether the object has a reference indicator. If so, then processing continues to INQUIRY 812. Otherwise, processing continues to INQUIRY 822.) If the reference indicator is set, then the reference count (356a) in the metadata is decremented and the reference indicator (356b) is reset (e.g., set to zero), STEP 814. Processing then continues to INQUIRY 822.

At INQUIRY 822, a determination is made as to whether it is the last object of that group. If it is, then the RareUpdateCount is updated, STEP 823, and processing is complete, STEP 824. Otherwise, if it is not the last object, INQUIRY 822, then processing continues to STEP 806.

Returning to INQUIRY 812, if the reference indicator is not set, then the reference count (356a) in the metadata is incremented, STEP 816. Further, a determination is made as to whether the reference count is greater than a predetermined number, such as, for instance, 5, INQUIRY 818. If it is not, then processing continues with INQUIRY 822. Otherwise, the object may be moved into, for instance, the deep very rarely referenced area, such as page group 0 or 1, in this example, since, according to the counter, it has not been referenced in quite a while. Further, the reference count is left in the metadata, STEP 820, and processing continues to INQUIRY 822.

Figure 9:
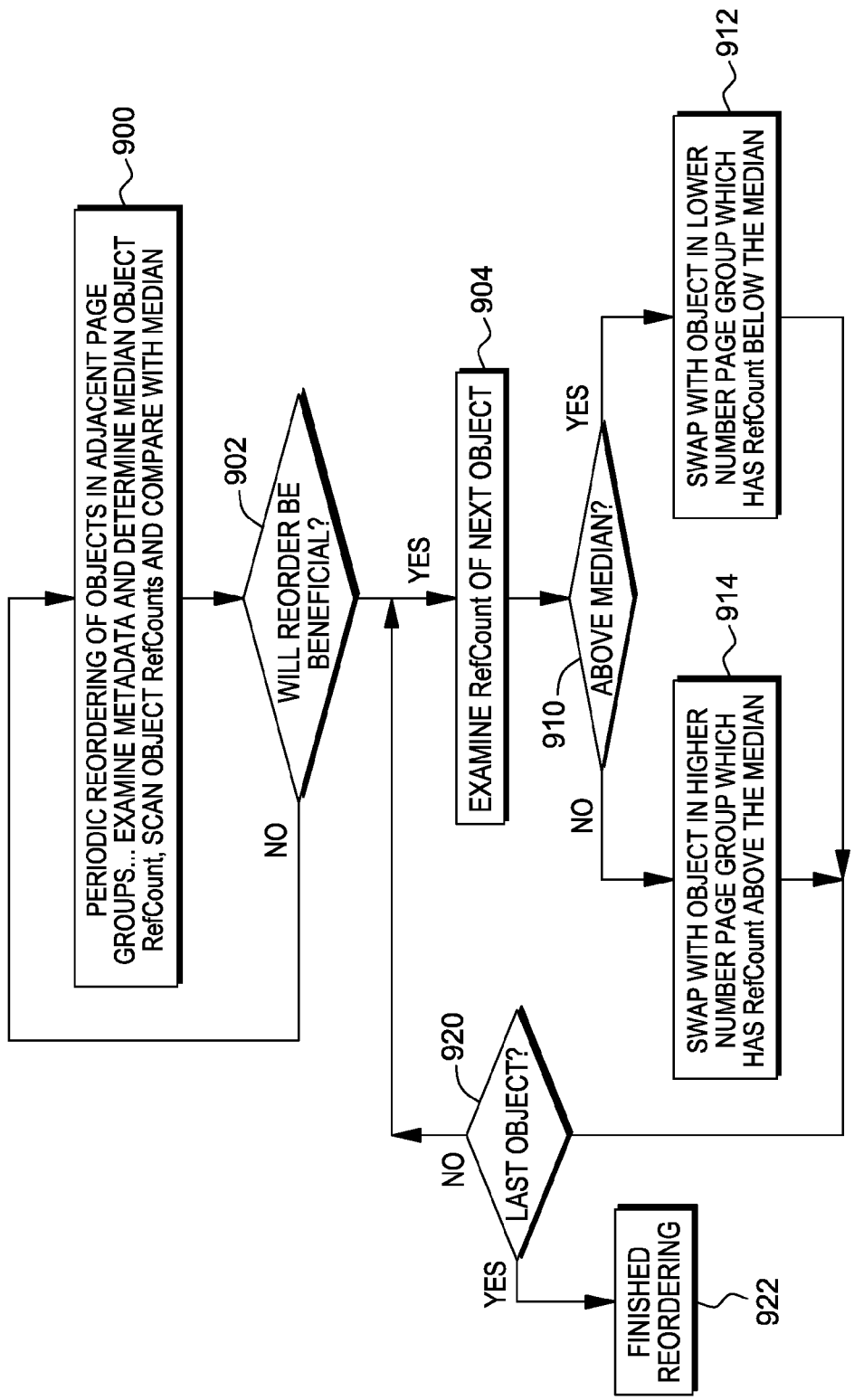
FIG. 9 depicts one embodiment of logic to re-order objects in page groups of a memory heap.

In yet a further embodiment, periodic reordering of objects in page groups is performed, an example of which is described with reference to FIG. 9. Initially, the memory manager examines the metadata of all of the objects for each of the page groups in a selected heap section to determine a median object RefCount for the heap section, STEP 900. Then, the memory manager scans the RefCounts of the objects and compares them with the median. A determination is made as to whether a reorder will be beneficial, i.e., are there RefCounts that differ from the median, INQUIRY 902. If it is determined that reordering will not be beneficial, then processing continues with STEP 900. However, if reordering would be beneficial, then the RefCount of a selected object of the metadata is examined, STEP 904. A determination is made as to whether the RefCount of the selected object is above the median, INQUIRY 910. If it is, then the object may be swapped with an object in a lower number page group which has a RefCount below the median, INQUIRY 912, and processing continues with INQUIRY 920. However, if the RefCount is not above the median, then the object may be swapped with an object in a higher number page group which has a RefCount above the median, STEP 914, and processing continues with INQUIRY 920. In further embodiments, the object may be swapped regardless of the RefCount of the object with which it is being swapped; and/or the swap may not occur if there is no object in the lower/higher number page group with a RefCount below/above the median, depending on the circumstance.

At INQUIRY 920, a determination is made as to whether this is the last object of the metadata to be examined. If it is the last object, then reordering is complete, STEP 922. Otherwise, processing continues with STEP 904.

Figure 10:
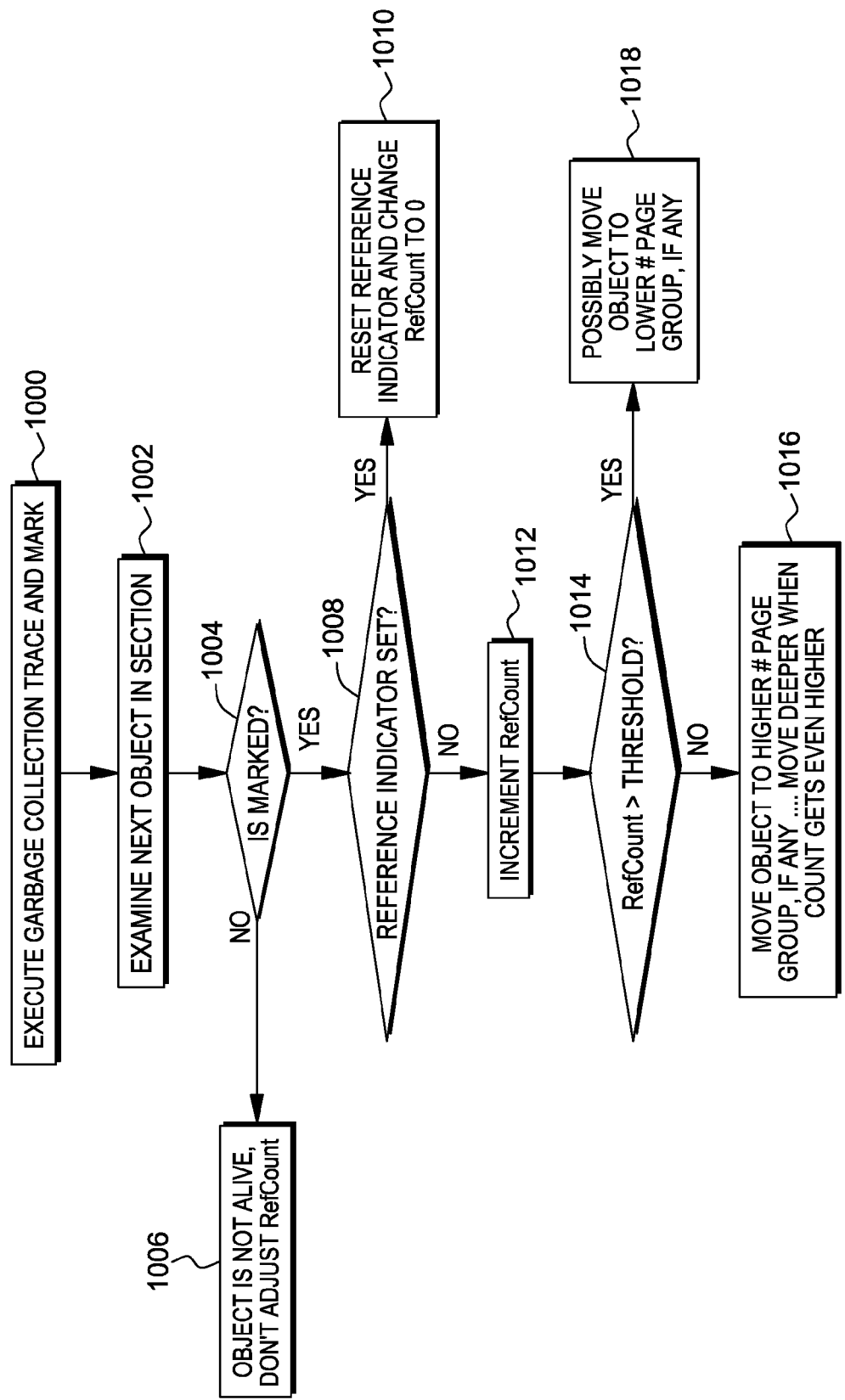
FIG. 10 depicts another embodiment of logic to perform garbage collection.

Another embodiment of garbage collection is described with reference to FIG. 10. In this embodiment, a garbage collection trace and mark is executed, STEP 1000, as described herein or in any other known manner. An object in a selected heap section is examined to determine if it is marked for collection, STEP 1002. A determination is made as to whether the object is marked, as being reachable or live, INQUIRY 1004. If it is not marked, then the object is not alive, the RefCount is not adjusted, and its memory is reclaimed, STEP 1006. However, if it is marked, then a further determination is made as to whether its reference indicator is set, INQUIRY 1008. If it is set, then the reference indicator is reset (e.g., set to zero) and RefCount is set to zero, STEP 1010. However, if the reference indicator is not set, then RefCount is incremented, STEP 1012.

Next, a determination is made as to whether the reference count (RefCount) is greater than a predefined threshold, INQUIRY 1014. If the reference count is greater than the threshold, then the object may be moved to a page group of, e.g., a lower number, into an unused object area, STEP 1018. Otherwise, it may be moved in the other direction to a page group with, e.g., a higher page group number, STEP 1016.

In one embodiment, subsequent to STEP 1010, 1016, or 1018, processing continues to STEP 1002. Further, in another embodiment, prior to INQUIRY 1008, a determination is made as to whether the object has a reference indicator. If it does, then processing continues with INQUIRY 1008. Otherwise, processing continues to STEP 1002.

Described in detail herein is a memory management facility, including garbage collection, compaction and/or reordering, that is optimized for a high memory over-commitment environment. In one or more aspects, a garbage collection technique is provided in which a much larger number of heap sections is created as compared to existing generational garbage collection systems. Object reference indictors (e.g., bits) are added to objects to create marks that indicate how recently the objects were touched relative to other objects.

Further, in one embodiment, a compaction phase follows garbage collection that is focused on grouping objects by their relative reference rate. For instance, least referenced objects are compacted, e.g., to the left (i.e., to lower number page groups), and most referenced objects are compacted towards the right (i.e., to higher number page groups). Free space is left in the middle and tracked with a set of pointers.

The garbage collection capability described herein does not resort to a global mark and sweep as often; thus, a much larger heap can be used in which frequently referenced objects are grouped together and left untouched over many partial garbage collections. One or more aspects allow JVMs to have very large virtual memory heaps without causing high virtual memory swapping rates at the hypervisor level.

One or more aspects provide a garbage collection technique and optimized JVM memory management settings. The garbage collection allows a hypervisor to achieve a much higher level of memory over-commitment when supporting multiple Linux instances (or any other operating systems). The garbage collection technique does not mark all of the objects in the Java heap during collection. It uses a technique of marking subsets of objects. As an example, the Java memory heap is divided into subsections. These subsections are used during the marking phase of garbage collection such that these subsections of the heap are to be marked without referencing other areas of the heap, as described herein.

In accordance with one or more further aspects, a memory heap is divided into a large number of heap sections (HS), e.g., 32, for this example. Memory allocation for new objects begins, for instance, at the first heap section (Active HS=0). A local root list is provided for each heap section. In one embodiment, when the active heap section becomes nearly full (or in another embodiment when certain page groups of a page section become full), garbage collection is run. The local root list for Heap Section 0 is used to help mark all of the active objects in HS 0. After several rounds of garbage collection for HS 0 there will eventually be a point when the number of active objects exceeds the space allocated in Heap Section 0. Then, the active heap section is dynamically changed to the next section (Active HS=1).

When a new object is added to HS 1, it is determined if the parent object is also in HS 1. If the parent is not in HS 1, the address of the new object is added to the local root list for HS 1. New objects are added to HS 1 and when HS 1 becomes nearly full, garbage collection is run on HS 1. The garbage collection mark phase provided by one or more aspects uses each entry of the local root list for HS 1 to trace the linked list of objects that are in the active HS, in this case HS=1. The mark phase does not reference objects in other heap sections. It is possible that the marking of objects in HS 1 will indicate that an object is still alive when it has actually been cut off from the real roots somewhere in an object in HS 0. This inefficiency is accepted, and the effect of this inefficiency is minimized by periodically performing a full garbage collection that uses the traditional technique of marking all live objects accurately in all sections of the heap at once.

The use of the other Heap Sections 3 to 31 continues in the same manner. When section 31 becomes full, the system wraps back to use Heap Section 0. By the time the wrap around occurs, there will be many objects in HS 0 that are not alive and have been cleared away by the periodic full garbage collection.

In one or more other embodiments, objects can be moved between heap sections based on the average reference rate for that heap section compared to the reference rate of the object. Over time, the least referenced objects end up together in, e.g., the first heap section, and the most often referenced objects end up in, e.g., the last heap section. Objects that are suddenly referenced more than their peers in their heap section are moved to, e.g., a higher heap section (possibly jumping across several sections).

One or more further aspects of the invention may also provide a technique to sort and compact the live objects within a single heap section so that more frequently accessed objects are kept together on a small number of memory pages, further reducing the memory working set of the Java system. Compaction is used which groups recently referenced objects together. Compaction is used only periodically, and the system rarely performs a full traditional garbage collection where all live objects are marked, a full sweep is done, and the remaining objects are compacted within their subsections of the heap.

When a program method for any object is run, a mark in the object's memory is made that indicates that it has been "touched" recently. These marks can be reset during the periodic full garbage collection done for the entire heap. The absence of these marks is used to indicate that an object is live but not frequently referenced. A compaction phase of the periodic full garbage collection is changed to group objects that are not frequently referenced together in specific memory pages within their heap section.

Rarely referenced objects are identified and packed close together. This allows whole virtual memory pages to become rarely referenced, and then, the normal virtual page management scheme will page those rarely listed pages out to disk for long periods of time. This reduces the virtual memory footprint of any Java program that runs in a system using one or more aspects of the invention.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit,"

"module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

Figure 11:
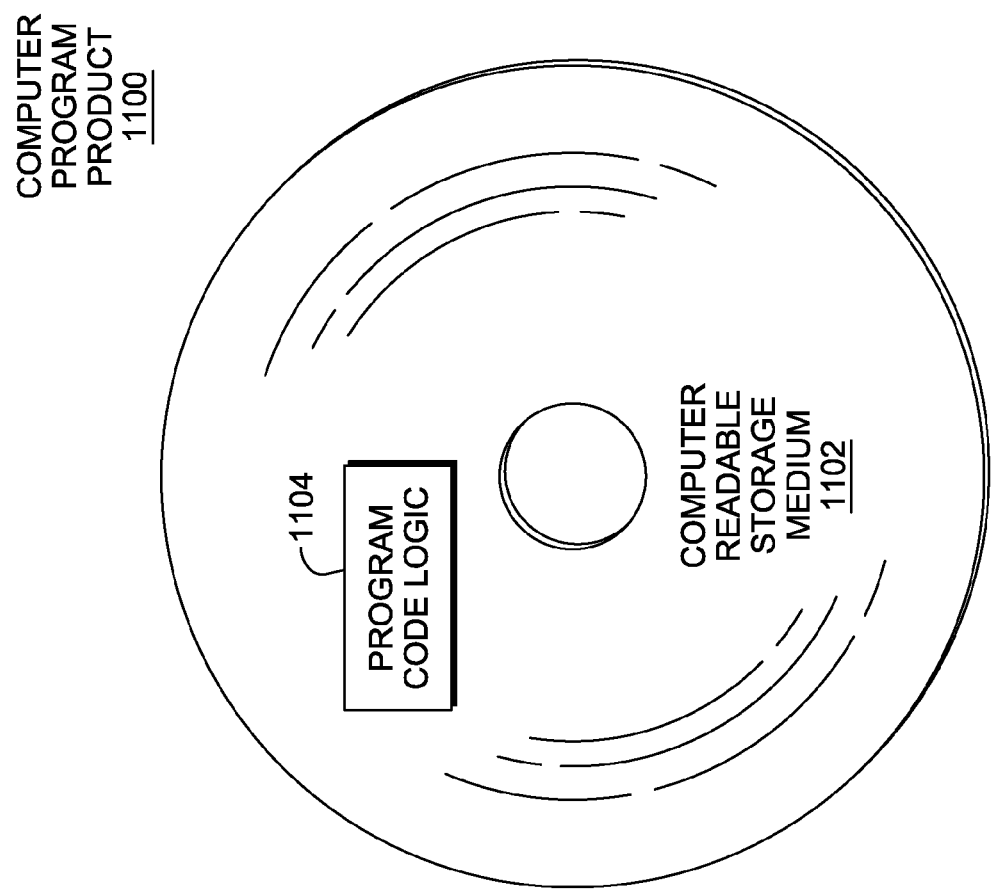
FIG. 11 depicts one embodiment of a computer program product incorporating one or more aspects.

Referring to FIG. 11, in one example, a computer program product 1100 includes, for instance, one or more non-transitory computer readable storage media 1102 to store computer readable program code means, logic and/or instructions 1104 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different thresholds, markers and/or indicators may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
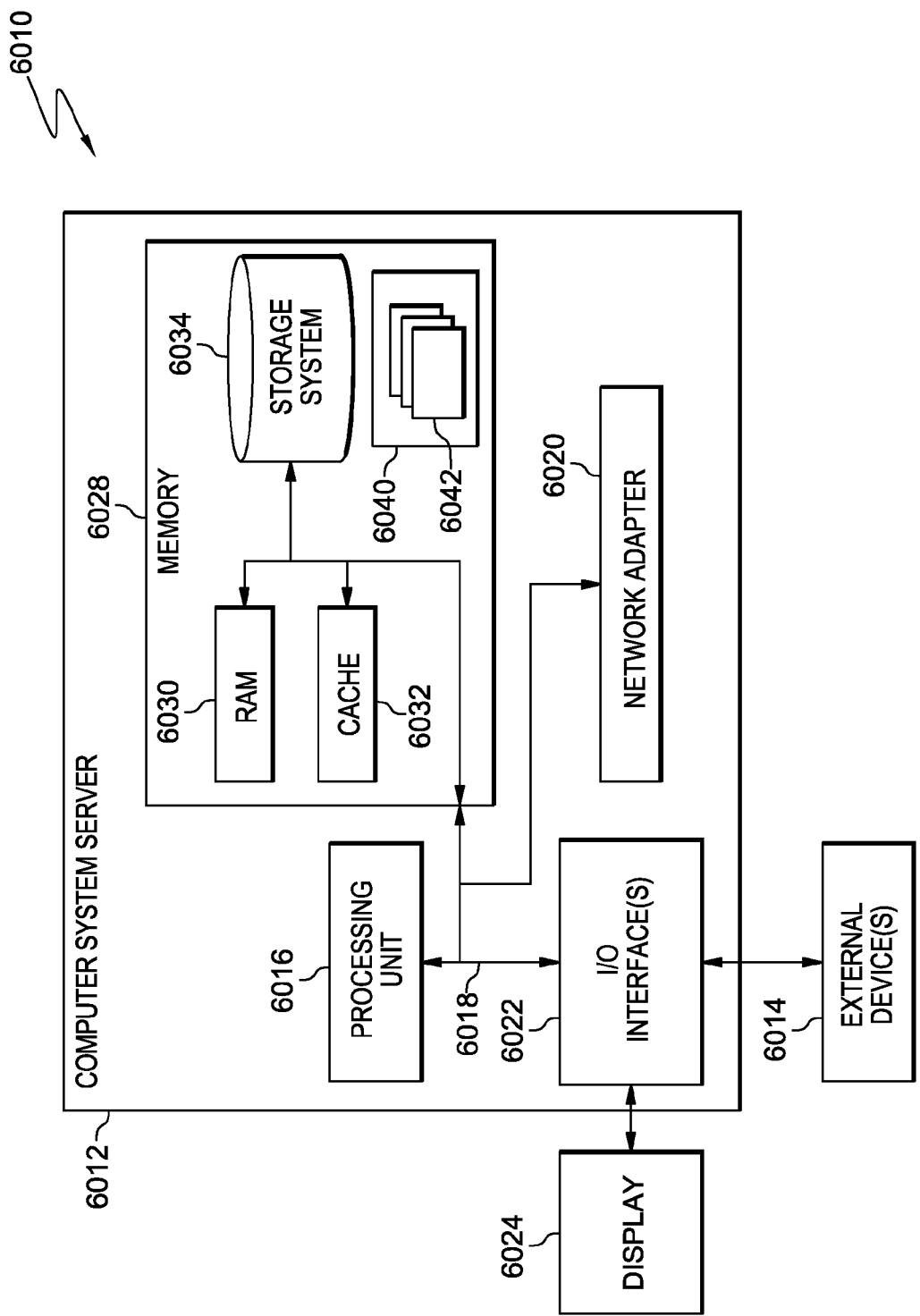
FIG. 12 depicts one embodiment of a cloud computing node.

Referring now to FIG. 12, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 13:
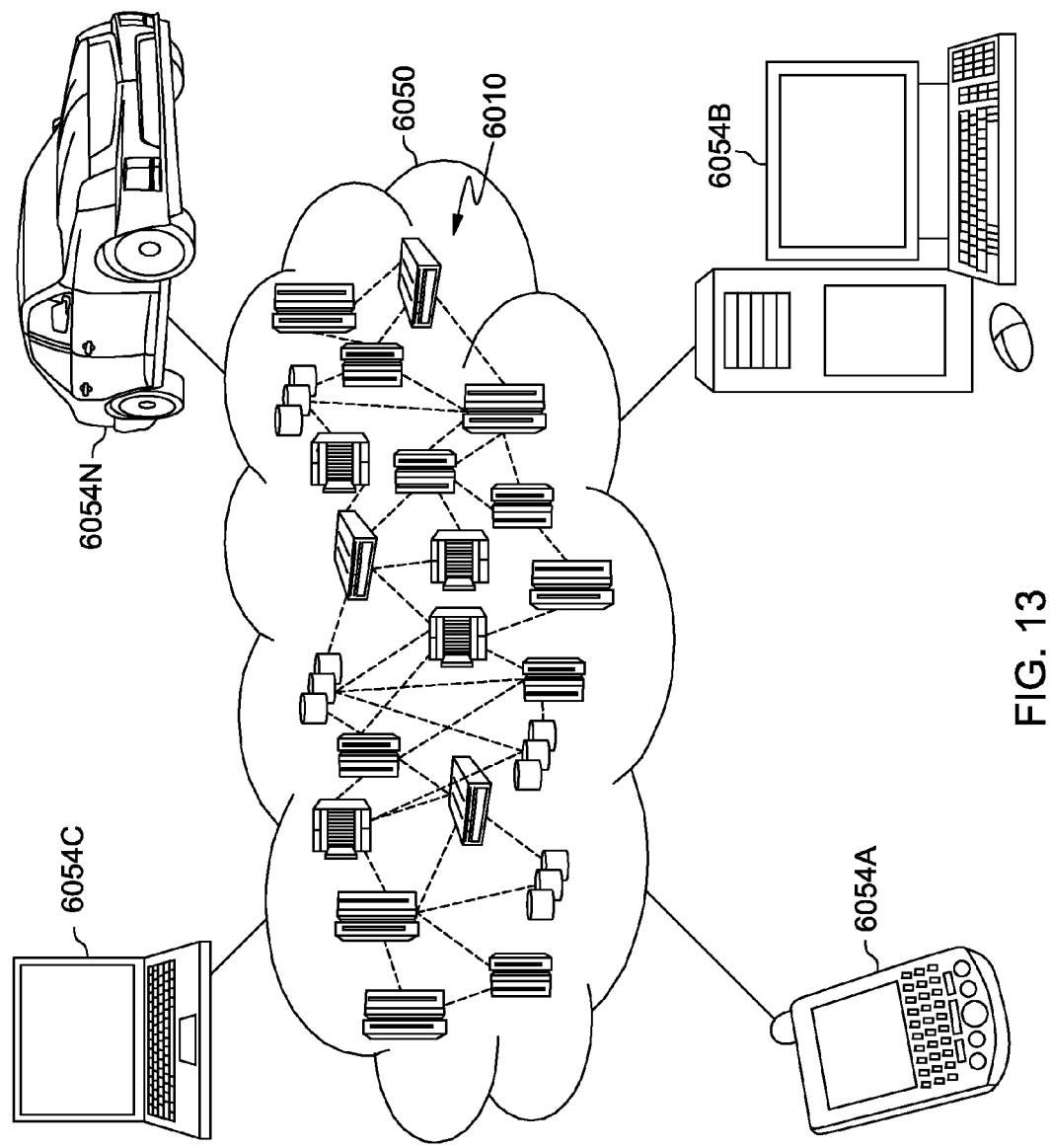
FIG. 13 depicts one embodiment of a cloud computing environment.

Referring now to FIG. 13, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 13 are intended to be illustrative only and that computing nodes 6010 and cloud computing environment 6050 can communicate with any type of computerized device over any type of network and/or network addressable connection (e.g., using a web browser).

Figure 14:
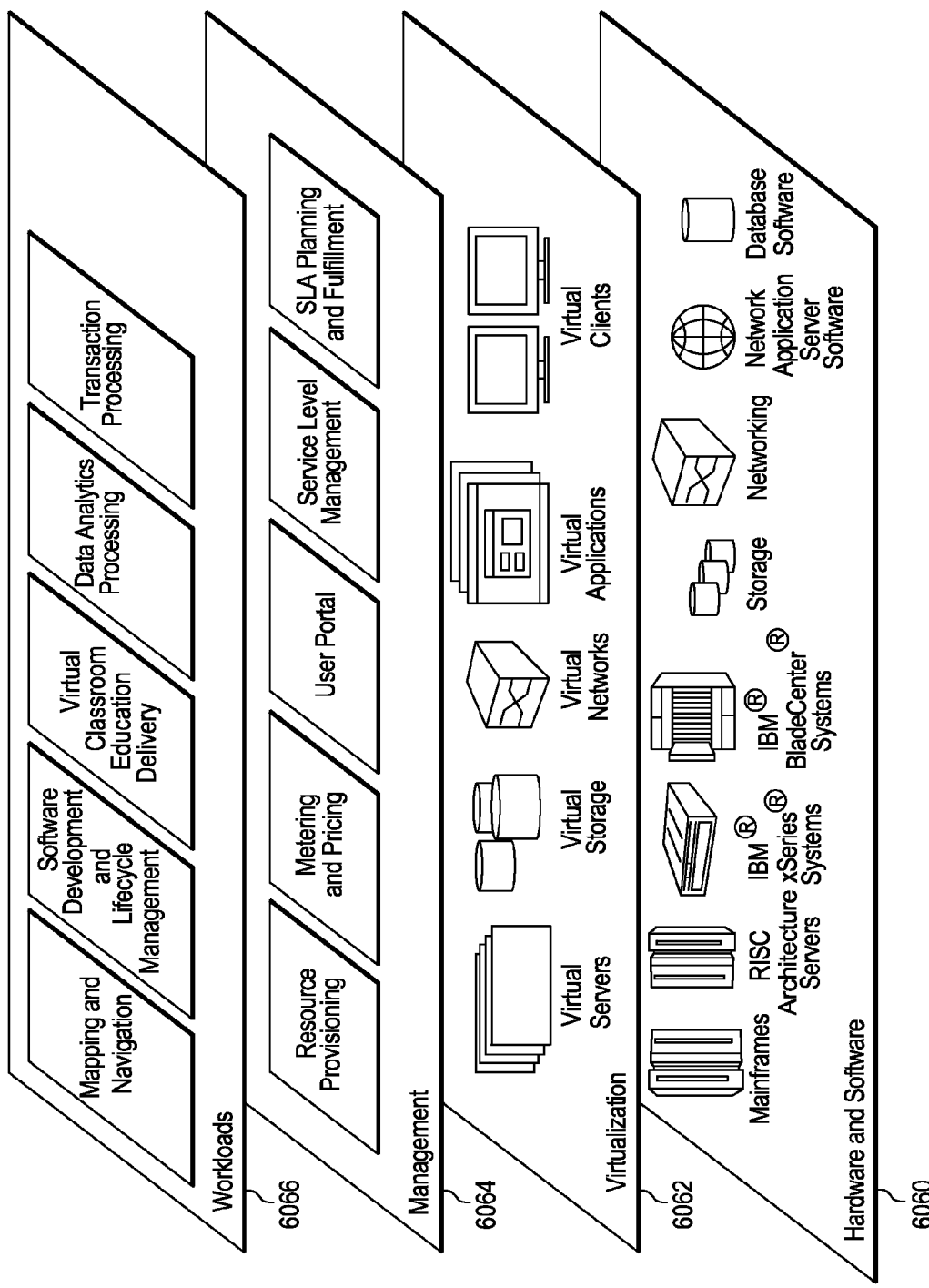
FIG. 14 depicts one example of abstraction model layers.

Referring now to FIG. 14, a set of functional abstraction layers provided by cloud computing environment 6050 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating management of memory heaps, said computer-implemented method comprising:

selecting a heap section of a memory heap to be examined for garbage collection, the heap section comprising a plurality of groups, the plurality of groups defined such that groups include objects of particular types, a particular type being defined based on frequency of reference of the objects within a group;

selecting one or more groups of the plurality of groups of the heap section to be examined for garbage collection, the selecting based on the particular type of the one or more groups;

determining whether garbage collection is to be performed for the selected one or more groups; and performing garbage collection on the selected one or more groups based on the determining indicating garbage collection is to be performed for the selected one or more groups, wherein the performing garbage collection comprises:

selecting an object of a group of the one or more groups selected for garbage collection;

determining whether the object is marked as reachable;

returning memory of the object to a free list of memory, based on the determining indicating the object is not reachable;

checking whether a reference indicator of the object is set, based on the determining indicating the object is marked as reachable; and moving the object from the group to another group of a particular type that differs from the particular type of the group, based on the checking indicating the reference indicator is not set.

2. The computer-implemented method of claim 1, wherein the particular type of the one or more groups selected to be examined is a type of frequently referenced objects, the frequently referenced being determined with reference to a defined value of referencing.

3. The computer-implemented method of claim 1, wherein the selecting the one or more groups for garbage collection comprises selecting less than all groups of the plurality of groups for garbage collection.

4. The computer-implemented method of claim 1, further comprising:
allocating objects in the memory heap, wherein the allocating comprises:
selecting one heap section of a plurality of heap sections of the memory heap to be a selected heap section to receive an object to be placed in the memory heap, wherein the selecting comprises:
determining whether one or more groups of a selected particular type in a chosen heap section have space for the object;
selecting the chosen heap section as the selected heap section, based on the one or more groups of the selected particular type in the chosen heap section having space for the object; and
selecting another heap section as the selected heap section based on determining the one or more groups of the selected particular type in the chosen heap section lack space for the object; and
selecting one group of the one or more groups of the selected heap section in which to include the object.

5. The computer-implemented method of claim 1, further comprising:
determining whether a selected heap section of a plurality of heap sections of the memory heap is to be examined for movement of one or more objects from one group of the selected heap section to another group of the selected heap section;

checking one or more objects of the one group, based on the determining indicating the selected heap section is to be examined, to determine whether the one or more objects are to be moved; and moving at least one object of the one or more objects to the another group based on the checking indicating the one or more objects are to be moved.

6. The computer-implemented method of claim 5, wherein the another group is defined as including objects that are referenced less frequently than the objects of the one group.

7. The computer-implemented method of claim 1, further comprising swapping one object of a first group of a selected heap section of a plurality of heap sections of the memory heap with another object of a second group of the selected heap section.

8. The computer-implemented method of claim 7, wherein the swapping comprises:
determining a median reference count for objects of the selected heap section;
comparing a reference count of the one object with the median reference count; and
swapping the one object with the another object in the second group based on the comparing, wherein the second group is, based on the comparison indicating the reference count is below the median reference count, of a type characterized as having more frequently referenced objects as compared to the objects of the first group, and the second group is, based on the comparison indicating the reference count is above the median reference count, of a type characterized as having less frequently referenced objects as compared to the objects of the first group.

9. The computer-implemented method of claim 1, wherein the performing garbage collection comprises performing garbage collection on an object of the heap section independent of status of the object in another heap section.

* * * * *